Patented Nov. 26, 1946

2,411,636

UNITED STATES PATENT OFFICE 2,411,636

STABILIZED FERROUS SULFATE

Ernst Preiswerk, Munchenstein, near Basel, Switzerland, assignor to Hoffmann-La Roche Inc., Nutley, N. J., a corporation of New Jersey No Drawing. Application May 6, 1943, Serial No. 485,945. In Switzerland May 6, 1942

7 Claims. (Cl. 167—72)

It is known that for oral therapeutic administration iron must be used in its ferrous form, because it is only resorbed in this form from the intestines. However, bad taste and great oxidizability are serious disadvantages for the oral use of the soluble ferrous salts. Difficulties due to the mechanical properties of the crystals, to their water-content, and to their oxidizability especially arise, for instance, on triturating the comparatively stable ferrous sulfate containing crystal-water. The trituration can more easily be carried out if, first the salt containing crystal-water is liberated from a part of its crystal-water by drying; by such a process, however, part of the ferrous salt oxidizes.

It has now been found that a stable preparation of ferrous salt can be obtained by adding a considerable quantity of ascorbic acid to a ferrous salt. Preferably, the preparation thereof is carried out in the following manner: Pure crystalline ferrous sulfate is at least partially dried and closely mixed with at least one fourth of its initial weight of ascorbic acid under trituration.

The quantitative proportion of ferrous salt and ascorbic acid may vary within wide limits; it depends, on one hand, on the method of preparation adopted, and, on the other, on the therapeutic purpose for which the product is to be used. It is above all essential that despite oxidative influences unchanged ascorbic acid should always be present until resorption occurs.

The products obtained according to the claimed process are stable for a practically unlimited period of time and they permit combining iron therapy with ascorbic acid therapy which in many cases supplement each other. The dose of iron can be kept low, because the iron remains entirely in its bivalent form until resorption takes place.

Example 1

380 parts by weight of crystalline ferrous sulfate ($FeSO_4.7H_2O$) are dried in vacuo at a temperature of about 50° C. without trituration. After 48 hours the disintegrated salt represents 232 parts by weight and it contains 32.8% of iron, i. e., approximately the quantity of iron theoretically calculated for $FeSO_4.H_2O$.

The dried ferrous sulfate is then ground with 95 parts by weight of laevo-ascorbic acid in a china ball-mill for 6 hours. After mixing, the iron content is 22.8%, that of ascorbic acid about 28.5%. The powder thus obtained can easily be worked up into pills by known methods.

Example 2

380 parts by weight of pure crystalline ferrous sulfate ($FeSO_4.7H_2O$) are mechanically triturated to fine grains and then dried in air at normal temperature for at least as long a period of time as is necessary to remove any humidity from the triturated crystals. 120 parts by weight of ascorbic acid are then admixed under trituration in a ball-mill and the substance is dried again. Grinding and drying by exposure to the air are continued until 428 parts by weight of a fine, almost white powder are finally obtained which contains iron in form of a ferrous sulfate with 4 mol of crystal-water. The appearance and properties of the product obtained are very much the same as those of the product obtained according to Example 1 and it is equally well suitable for the working up into a form of medicinal preparation.

I claim:

1. A stable medicinal preparation substantially consisting of at least partially dried crystalline ferrous sulfate containing a maximum of four moles of combined water closely mixed with at least one-fourth of its weight of ascorbic acid.

2. A stable medicinal preparation substantially consisting of at least partially dried crystalline ferrous sulfate containing approximately the quantity of iron calculated for $FeSO_4.H_2O$ closely admixed with ascorbic acid, the iron content of the mixture being about 22.8% and the ascorbic acid content being about 28.5%.

3. A stable medicinal preparation substantially consisting of crystalline ferrous sulfate having four mols of crystal water intimately admixed with at least one-fourth of its weight of ascorbic acid.

4. Process which comprises partially drying crystalline ferrous sulfate to a maximum of four moles of combined water and thereafter adding thereto ascorbic acid.

5. The process of claim 4 in which ferrous sulfate, containing 7 mols of water, is dried to ferrous sulfate containing 1 mol of water in the combined form.

6. The process of claim 4 in which ferrous sulfate, containing 7 mols of combined water, is dried to ferrous sulfate containing 4 mols of combined water.

7. The process of claim 4 in which the amount of added ascorbic acid is at least one-fourth the weight of the dried ferrous sulfate.

ERNST PREISWERK.